United States Patent [19]
Eckstein, Jr.

[11] 3,947,833
[45] Mar. 30, 1976

[54] AUTOMATIC TARGET DETECTION SYSTEM

[75] Inventor: Royal W. Eckstein, Jr., Indianapolis, Ind.

[73] Assignee: The United States of America as represented by the Secretary of the Navy, Washington, D.C.

[22] Filed: Nov. 20, 1974

[21] Appl. No.: 526,570

[52] U.S. Cl. 340/258 R; 178/DIG. 38; 340/146.3 Q; 340/149 R; 356/156
[51] Int. Cl.$^2$ G01D 21/04; G06K 9/00; H04N 3/00; G01B 9/21
[58] Field of Search ..... 178/DIG. 38; 250/221, 567; 340/5 MP, 146.3 Q, 146.3 S, 146.3 AC, 258 R, 149 R; 343/5 SA; 356/168, 156

[56] References Cited
UNITED STATES PATENTS

| | | | |
|---|---|---|---|
| 2,412,822 | 12/1946 | Malter | 250/221 |
| 3,716,823 | 2/1973 | Thompson et al. | 343/5 SA |
| 3,823,261 | 7/1974 | Bolsey | 340/146.3 Q |
| 3,885,224 | 5/1975 | Klahr | 340/5 MP |

FOREIGN PATENTS OR APPLICATIONS

| | | | |
|---|---|---|---|
| 911,824 | 5/1945 | Germany | 340/3 |

Primary Examiner—Maynard R. Wilbur
Assistant Examiner—S. C. Buczinski
Attorney, Agent, or Firm—R. S. Sciascia; Paul S. Collignon

[57] ABSTRACT

An automatic target detector for determining the probability that an object in water is a swimmer. An electro-optical sensor is provided for viewing a target in water and contrast and width of the target are measured to assign probabilities that a target is a swimmer. A target which shows acceptable contrast and width is encoded and the encoded information is compared with stored reference scenes to make a final determination of whether or not a target is a swimmer.

5 Claims, 9 Drawing Figures

AUTOMATIC TARGET DETECTION SYSTEM

BACKGROUND OF THE INVENTION

The advent of self-contained underwater breathing (SCUBA) gear has provided swimmers with a capability of performing valuable military assistance in such areas as sabotage, reconnaisance, and clearance of obstacles which will prevent or hinder small landing craft. During the second World War, for example, frogmen were credited with sinking large tonnage of ships by attaching explosive devices to the sides and bottoms of ships. In order for a frogman or swimmer to be effective, it is necessary for him to remain undetected for a man in water is not capable of effective combat with someone on the surface, either on land, air, or on a ship. Thus a frogman relies mainly on darkness and camouflage to escape detection.

Various items also float in water and any automatic detection device should be able to discriminate between a person and other objects, such as floating logs. This detection might be based on size, contract, speed of movement, and the like. Devices that can discriminate between various shapes of items are known in the art and, likewise, devices that discriminate or measure the contrast within an item are known. For example, in U.S. Pat. No. 3,529,169, which issued Sept. 15, 1970, to Richard Heaney et al, there is shown a device for detecting the shape of a ware, such as a bottle. In this device, light is projected through a rotating ware and the ware profile in the form of a shadow is cast on an array of light responsive devices. Such a shadow represents the configuration or profile of the ware. The array of light responsive devices, in turn, are arranged to detect both inward and outward deviations from a standard or desired shadow profile or a desired configuration of the rotating ware. Ware with no distortion or configuration defect will have a stationary pattern or a preselected shadow profile. On the other hand, a ware with distortion or with a configuration defect will produce a moving shadow or a nonconforming shadow profile. It is the array of light responsive devices that detects whether the configuration of the rotating ware conforms to preselected conditions and controls the operation of a decision circuit for either signaling the reject or accept status of the rotating ware or for controlling the operation of a reject or accept device disposed in the path of travel of the ware after the ware leaves the inspection station.

In U.S. Pat. No. 3,154,625, which issued Oct. 27, 1964, to James H. Kail, there is shown a device for grading meat by measuring the amount of fat in a cut. In this method, light is reflected from a cut of meat into a photometer which is adapted to register light reflected from fat but not to register light reflected from muscle. The percentage of fat present in the cut is used to grade the cut of meat.

SUMMARY OF THE INVENTION

The present invention relates to a device for first detecting an object in water and then making a determination as to whether that object is a swimmer. The present invention is based on the fact that all targets will exhibit a constant contrast direction, that is, either light targets on a dark background or dark targets on a light background. This fact is combined with the physical size limits of the target to define rectangular areas which may contain targets.

An electro-optical sensor is used to view a target and a line target recognizer is used to measure the contrast and width of a potential target and then assigns probabilities that a target is not a swimmer. It has been previously determined that a swimmer will show a contrast greater than 2.5 percent and a width of between 4 inches and 6 feet. The two probabilities are multiplied to obtain a joint probability that a target is not a swimmer. When it is determined that an object could be a swimmer, the information received from the electro-optical sensor is encoded and stored and then compared with various reference scenes by correlation to make a final determination as to whether or not the detected target is a swimmer. When the detected target and a reference scene indicate that the target is a swimmer, a suitable alarm, such as an audible signal or a light is energized to alert personnel.

It is therefore a general object of the present invention to provide an automatic device for determining if an object in water is a swimmer by correlating a probable target with a reference scene.

Other objects, advantages and novel features of the present invention will become apparent from the following detailed description of the invention when considered in conjunction with the accompanying drawings.

DESCRIPTION OF THE PREFERRED EMBODIMENT

Figure 1:
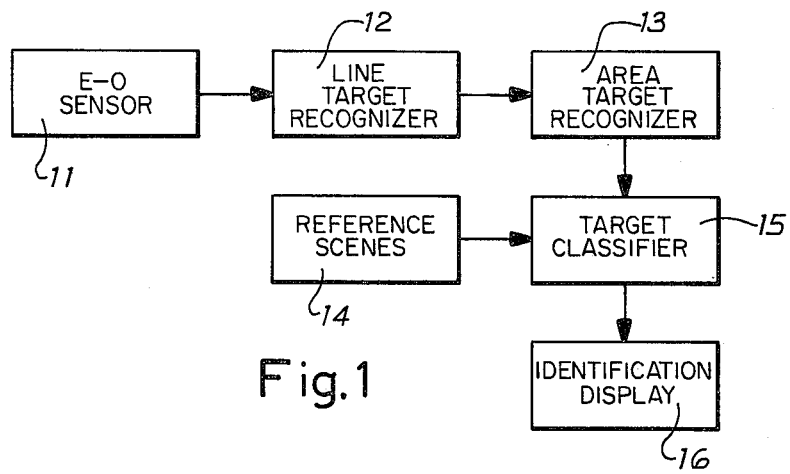
FIG. 1 is a block diagram of a preferred embodiment of the present invention.

Referring now to the drawings, there is shown in FIG. 1, a block diagram of a video classifier which will operate in real time. An electro-optical sensor 11 is used to view a target in water, which may or may not be a swimmer, and the target is recognized on a video line by a line target recognizer 12. Line targets, in turn, are recognized as a combination, which makes an area target, by an area target recognizer 13. The area target video is converted to digital information and stored target arrays are compared with stylized target arrays, or reference scenes 14, in target classifier 15, and, when a swimmer is recognized, this decision is displayed on an identification display 16. By way of example, display 16 might be a light, an audible alarm, or the like.

Line target recognizer 12 measures the contrast and width of a potential target and assigns probabilities that a target is not a swimmer for both contrast and width, if the variables are within acceptable ranges. Acceptable ranges, by way of example, might be a constrast greater than 2.5 percent and width between 4 inches and 6 feet. The two probabilities are then multiplied to obtain a joint probability that a target is not a swimmer. If this joint probability falls below a threshold value a binary number is presented to area target recognizer 13. The binary number identifies the horizontal starting point of the line, the vertical line number, and the width of the suspected target.

Figure 2:
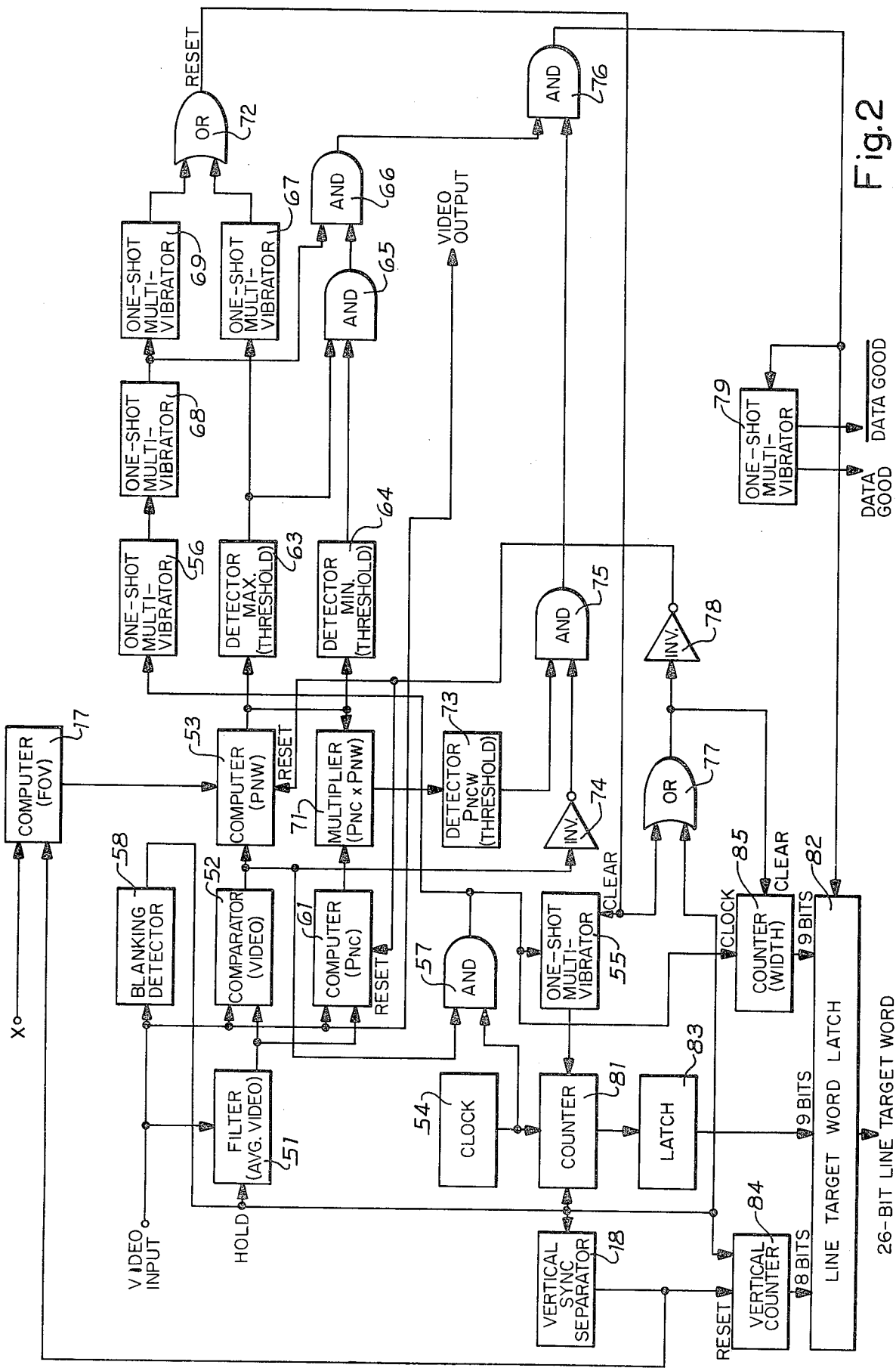
FIG. 2 is a logic diagram of the line target recognizer shown in FIG. 1 of the drawings.

Referring now to FIG. 2 of the drawings, there is shown a diagram of line target recognizer 12 which shows the logic functions and timing required to implement the device. Computer 17 accepts downlook angle (X) and vertical line number (n) as variables and computes the line field-of-view (FOV), in feet. The equations are as follows:

(1) $R = h/X$ (For small angles);

(2) For centerline of the FOV: $FOV = R\beta = \dfrac{h\beta}{X}$;

(3) For the top line, $FOV = \dfrac{h\beta}{X - \dfrac{\beta}{2}}$ (4) For any line, $FOV = \dfrac{h\beta}{X - \dfrac{\beta}{2} + n\left(\dfrac{\beta}{N}\right)}$; and (5) For the FOV for line $n$, $FOV = \dfrac{h}{\dfrac{X}{\beta} - \dfrac{1}{2} + \dfrac{n}{N}}$.

where:
 $X$ = downlook angle
 $\beta$ = sensor field-of-view
 $h$ = height of sensor
 $n$ = number of vertical line
 $N$ = total number of lines; and
 $R$ = range.

Figure 3:
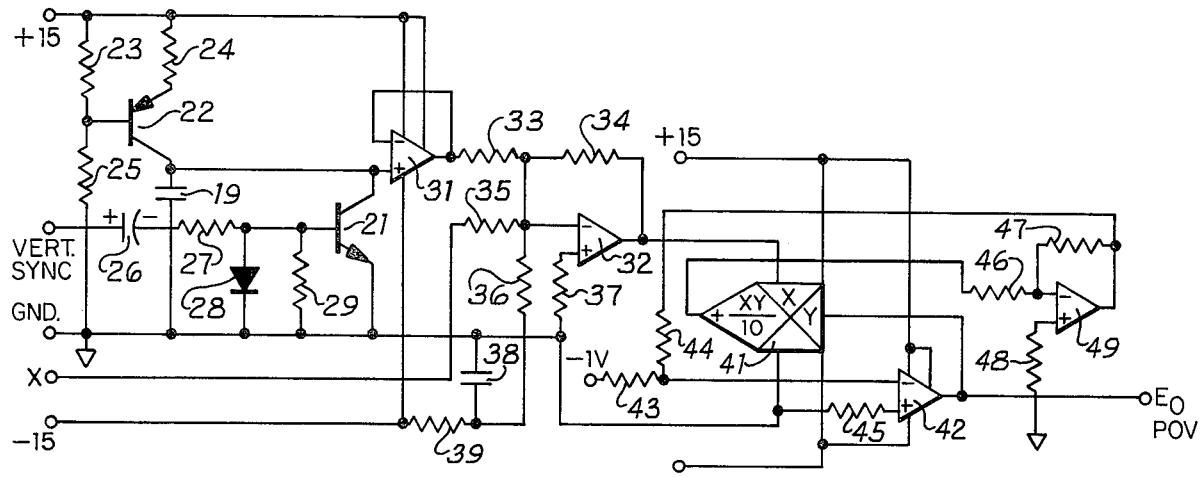
FIG. 3 is a schematic diagram showing circuitry for deriving field-of-view (FOV)

Equation 5 is implemented as shown in FIG. 3 of the drawings. Since all the variable terms in the equation are in the denominator, the computation is a matter of scaling, adding, and offsets for an analogue computation except for the inverse function which must be performed. To form the inverse, a multiplier is used in conjunction with an operational amplifier and, as the summation cannot be performed at the input variable point, three operational amplifiers and a multiplier are required.

Referring now to FIG. 3 of the drawings, there is shown a circuit diagram for solving equation 5. The vertical sync pulse from vertical sync separator 18 resets capacitor 19 to zero volts by driving NPN transistor 21 into saturation. At the end of the sync pulse, capacitor 19 is charged by a constant current supplied by PNP transistor 22. Amplifier 31 is connected as a voltage follower to prevent loading of the ramp across capacitor 19 and amplifier 32 inverts and scales the ramp and sums the downlook angle of the center of the field-of-view with the swept angle. The output of amplifier 32 is an analogue of the downlook angle for each horizontal line in a horizontally scanned raster. An analogue multiplier 41 and amplifier 42 are connected as a divider to provide an output representing the instantaneous field-of-view for the electro-optical sensor 11. An inverting amplifier 49 is provided as multiplier 41 provides only a $+xy/10$ as an output and operation as a divider requires a $-xy$ function.

The first decision in the identification of a target is based on contrast. A target without contrast cannot be detected and, with an active sensor 11, the contrast will normally be positive, that is, will be a bright target against a dark background. The positive contrast is detected by averaging the video by filter 51 and then comparing by comparator 52 the instantaneous value of the video signal with the average value. When the positive difference exceeds a threshold value, a comparator output is generated. The video comparator 52 output allows a target width measurement to be made by computer 53 while the output is positive and is used with the horizontal clock 54 to trigger two retriggerable one-shot multivibrators 55 and 56. As shown in FIG. 2 of the drawing, the outputs of comparator 52 and clock 54 are connected to multivibrators 55 and 56 through "AND" gate 57. The average video value is held during blanking to prevent an erroneous average due to the horizontal synchronizing pulses.

The sensor field-of-view is computed in feet by computer 17 and is available as a voltage. By converting the field of view analogue into a controlled current, a target time measurement can be converted to target width. The electronic equation is:

6 $CE = Q = It$ or (7) $E = \dfrac{It}{C}$.

where
 $E$ = voltage;
 $Q$ = charge;
 $I$ = current; and
 $t$ = time

Figure 7:
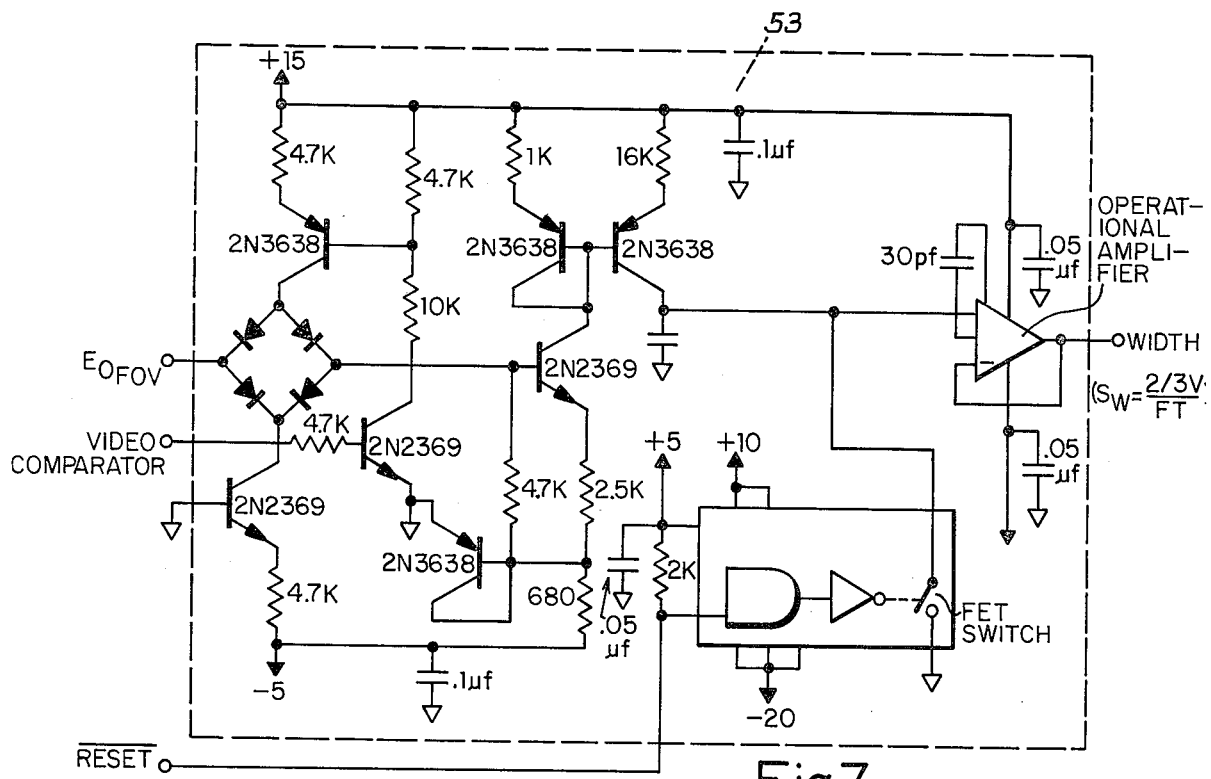
FIG. 7 is a schematic diagram of a computer for converting target time to width.

Since C is fixed, I is computed and t is measured, the equation $E = It/C$ converts the measured time into a voltage analogue of target width. FIG. 7 of the drawing is a schematic diagram of a circuit showing component value for providing an output scale factor of ⅓ volt per foot. It being understood, of course, that those skilled in the art could provide other component values if another scale factor is desired.

Figure 9:
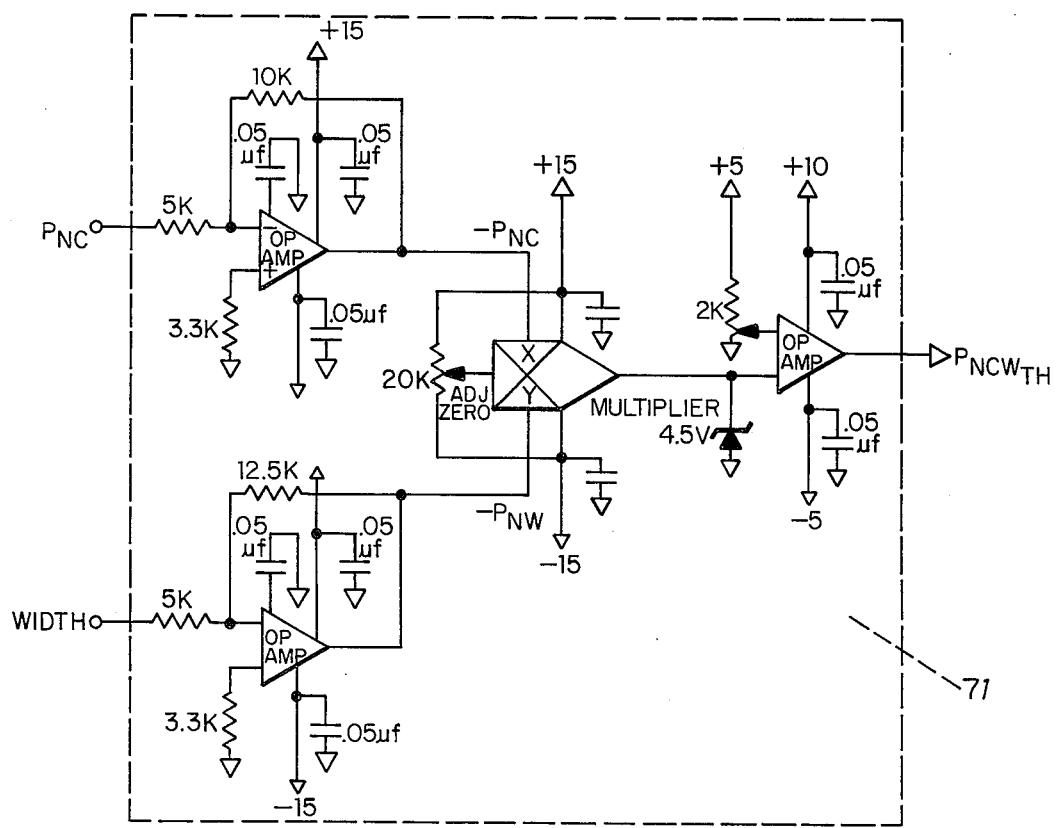
FIG. 9 is a schematic diagram for computing joint probability of a target.
Figure 8:
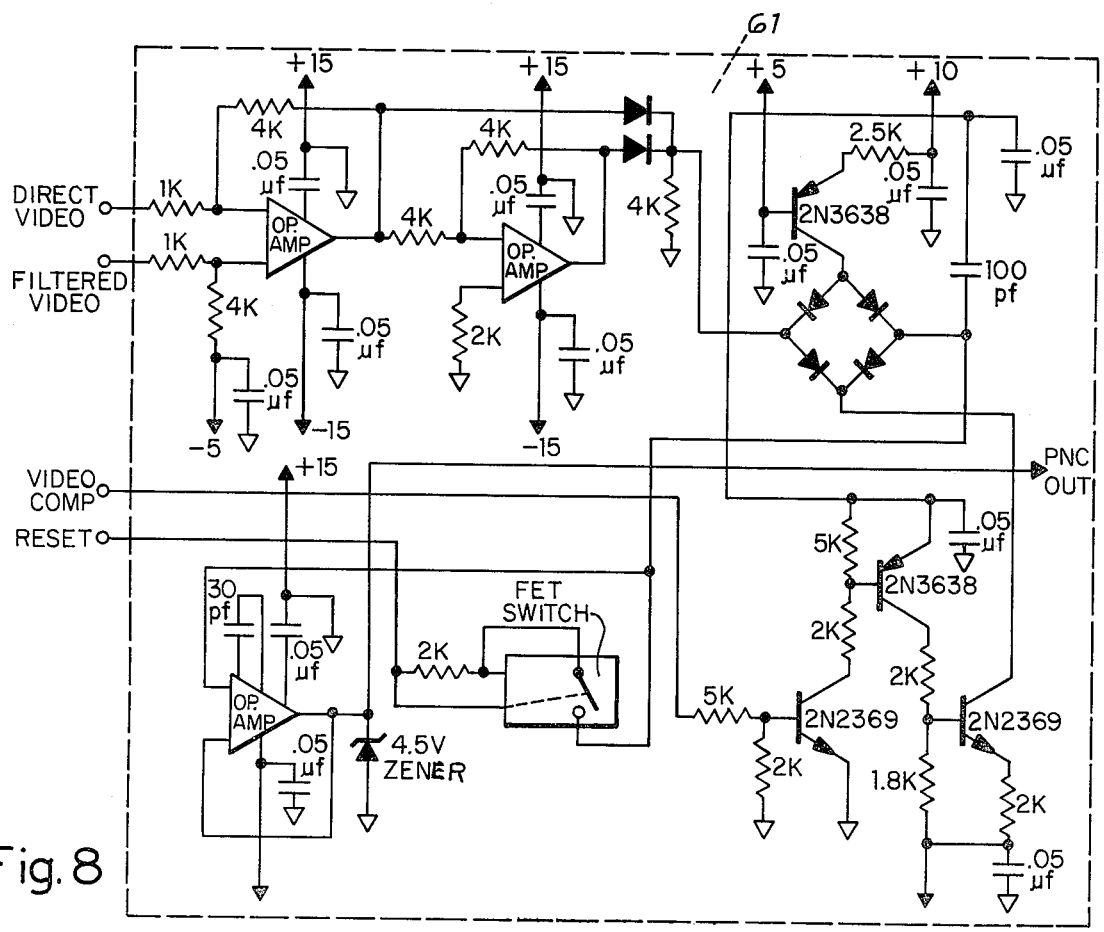
FIG. 8 is a schematic diagram of a computer for determining target contrast.

The probability that a signal is not a target is a non-linear curve with a minimum at the most likely target contrast for a passive system. For an active system either an illumination taper can be generated, a line-by-line automatic gain control can be included in the sensor, or the not-target probability can be three dimensional with a range-squared function as one of the inputs to computer 61. FIG. 8 of the drawings is a schematic diagram of a function generator for computing $P_{NOT\text{-}CONTRAST}$. It can be seen that the two inputs are direct video and filtered video and the output $P_{NC}$ is applied to multiplier 71. FIG. 9 of the drawings is a schematic diagram showing component values for rescaling of not-target contrast probability. The multiplier scale factors are 10 volts full scale on each input to provide 10 volts full scale output. Thus 1 = 10 volts for $P_{NC}$, $P_{NW}$, and $P_{NCW}$. The $P_{NCW}$ threshold can be either manually set or can be controlled by the area target memory.

The output of computer 53, which is a voltage proportional to target width, is applied to detectors 63 and 64. Detector 63 is set to eliminate targets that are too wide and detector 64 is set to eliminate targets that are too narrow.

Referring now to FIG. 2 of the drawings, it can be seen that the output of horizontal counter 81 is applied to a line target word latch 82 through a horizontal latch 83. A vertical counter 84 which, by way of example, might be an 8-bit counter, is used to generate a binary number for each line. Counter 84 counts horizontal synchronizing pulses and is reset by the vertical synchronizing pulses from vertical sync separator 18. As counter 84 is stationary during a complete line, no vertical latch is needed. A clock burst from horizontal clock 54 is connected to binary ripple counter 85 which converts target time to a binary number and, as the clock burst ends when target contrast falls below a threshold value, the number in the target width counter 85 will be stationary after a target has been detected. Counter 85 serves as its own memory and the output from counter 85 is applied to line target word latch 82. The line word latch 82 is a temporary memory which stores the horizontal starting point of a target, vertical line number, and target width. After the data latch has been loaded, line target recognizer 12 is reset and a "data good" pulse is provided to area target recognizer 13.

Figure 5:
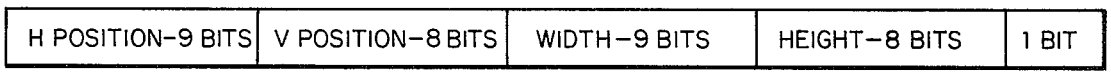
FIG. 5 is a diagram showing a target word composition.

The area target recognizer 13 and target classifier 15 are interrelated in that they share a large semiconductor memory. By way of example, a 1024-bit dynamic memory might be used as such a memory is inexpensive, very flexible and manufactured by several different vendors. One such memory device is manufactured and sold by the Signetics Corp., Sunnyvale, California 94086, under the tradename "Signetics 1103." The "Signetics 1103" is a 1024 word by 1 bit random access memory element using enhancement mode P-channel MOS devices integrated on a monolithic array. Information stored in the memory is nondestructively read. Refreshing of all 1024 bits is accomplished in 32 read cycles and is required every 2 milliseconds. The dynamic memory is organized as 1024 words with each word consisting of one bit and the cycle time is a minimum of 580 nanoseconds. The word size required is determined by the area target recognizer 13. To sort targets on the basis of height, a word of 8 bits is added to the 26-bit word from the line target recognized 12 and, to identify the lower boundary of a target, a check bit is added. As shown in FIG. 5 of the drawings, a total word length of 35 bits is required to perform the area target recognition function. Because of the semiconductor memory organization, there are 1024 words available, each of which is 35 bits long.

The organization into 1024 words are subdivided into a group of 32 words for the area target recognition, 32 words for identified area target storage, and 960 words for target array storage. Assigned addresses are:

a. 00000(xxxxx) 32 line data words; and
b. 00001(xxxxx) 32 area data words.

The line data words will correspond to 32 Horizontal position bins and will be in use during the first field scan. Each position bin will correspond to 53 microseconds (horizontal line video time) divided by 32 or about 1.65 microseconds. At maximum effective range, this time is equivalent to 5.6 inches and should provide resolution sufficient to store all line target recognizer outputs. The time is also adequate to perform a read/-write cycle and a write cycle, which is required to remove a valid target from the line data memory and store it in the area data memory. To meet the data rate requirements of the system, the machine is a wireprogrammed parallel processor. The functions performed to recognize an area target are storage of line targets in a position bin, matching new line targets with old line targets, elimination of targets which fall outside of an acceptable range of vertical size, determination of the vertical boundary of a target, clearing a range bin of a completed or unacceptable target, and storage of an acceptable target in the area target portion of the memory.

Figure 4:
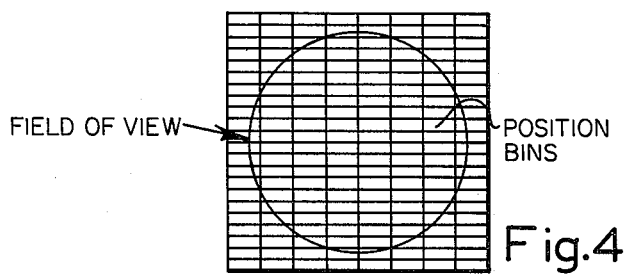
FIG. 4 is a diagram showing position bins of a video presentation.

Referring now to FIG. 4 of the drawings, there is shown a division of a video presentation into position bins. The position bins are areas of the raster, each one of which represents 16 resolution elements on a horizontal line. The 26-bit line target word generated by the line target recognizer identifies the lefthand edge (starting point) of the target with a 9-bit byte. By accepting only the five most significant bits of the 9-bit byte, a position bin address for the horizontal target is generated. If five zeros are added preceding the position bin address, a main memory address results which will be the same for any target with a leading edge which falls on a resolution element within the position bin. A single area target may be made up of line targets which fall in either an earlier or later position bin than the preceding target. To make a vertical size measurement, it is therefore necessary to test the position bins on either side, as well as the one in which a target occurs. If a target has been stored in any of the three locations, it is combined with the new target and stored in the position bin indicated by the new target. The word arrangement is as shown in FIG. 5 of the drawings.

Figure 6:
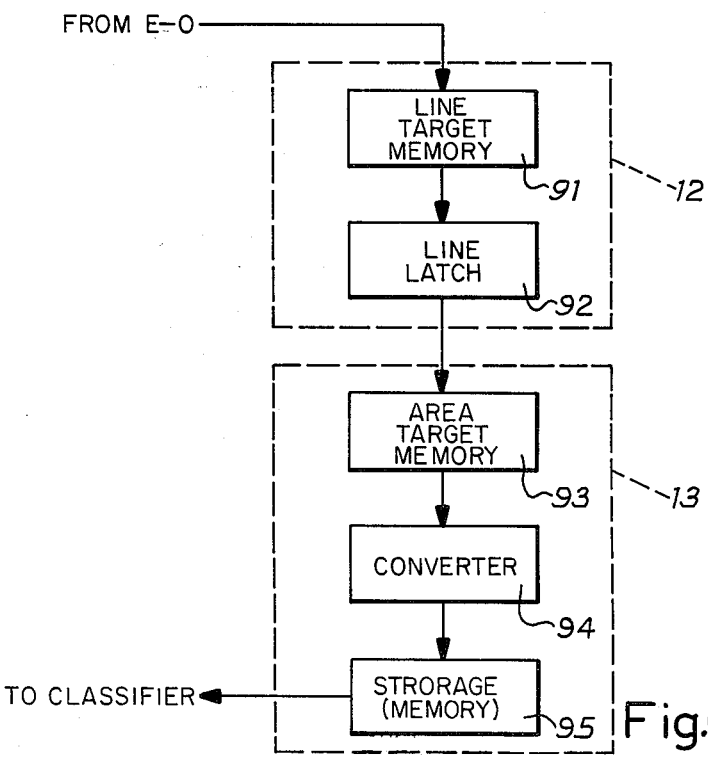
FIG. 6 is a block diagram showing the memory system of a line target recognizer and an area target recognizer.

As shown in FIG. 6 of the drawings, when the position bins are read, the data will be transferred to a latch 92 and memory 91 will be cleared at that location. This is accomplished in one read/write cycle time and a separate cycle is not required to clear position bins as data moves from one bin to another. Data from the line target recognizer 12 is stored in a particular position bin if no prior targets are present or combined with any prior targets and stored in the appropriate bin. Targets that grow too tall have been rejected. When the lower boundary of a target has been reached, no more line targets will accumulate on a particular area target. To clear the position bin for targets which may be below the one detected, the completed target is transferred to an area target memory 93, which is simply 32 words set aside for this purpose. The information required to made a decision to store a target is supplied by bit number 35, the "1 bit" shown in FIG. 5 of the drawings. By reading the position bin words one-half of a line behind the sweep position, every target in a position bin is available at the horizontal line rate. If there is a "1" present in the 35th bit of a detected target, the "1" is changed to a zero and the target is restored. If a zero is present in the 35th bit of a stored target, the height of the target is examined and, if it is not too small, the target is stored in area target memory 93. The 32 position bins allow both a read/write cycle and a write cycle to be performed in the time occupied by one position bin on the horizontal sweep. The word is read and the memory location cleared, and the word is then stored at the same location, completely rejected, or stored in the area target portion of the memory. The position bin address is generated by taking the five most significant bits from the horizontal counter in the line target recognizer. The most significant bit is inverted, and an address results which is always 16 bins away from the horizontal scan position. The "DATA GOOD" pulse, which is shown in FIG. 2 of the drawings, loads the five most significant bits from the H position byte and causes the loaded counter to count down one. At the same time, the position bin scanning process is stopped after completion of the cycle being performed.

After the possible target areas are located and stored in area target memory 93, they are converted by converter 94 to digital form and stored in storage memory 95. As shown in FIG. 1 of the drawing, the stored target array in memory 95 is compared with a stylized target array stored as reference scenes 14. By way of example, target classifier 15 might be a correlator, which are well-known in the art. For example, in U.S. Pat. No. 3,794,272, which issued Feb. 26, 1974, to Klaus J. Hecker, there is shown a correlator for digitally correlating a video signal viewed by a TV with a reference or memorized scene. Other correlators are shown in U.S. Pat. No. 3,591,715, which issued July 6, 1971, to David Rubin et al and in U.S. Pat. No. 3,646,333, which issued Feb. 29, 1972, to Cabell N. Pryor, Jr. The identification display 16 might be a light or an audible signal which is energized when a target is identified as a swimmer.

OPERATION

The operation of the target detection system herein described can be divided into four functions, that is, a target is recognized on a video line; line targets are recognized as a combination which makes an area target; area target video is converted to digital information and stored; and stored target arrays are compared with stylized target arrays to determine target classification. A line target recognizer 12 measures the contrast and width of a potential target and assigns probabilities that a target is not a swimmer for both contrast and width. The two probabilities are multiplied to obtain a joint probability that a target is not a swimmer. When this joint probability falls below a threshold value, a binary number is presented to the area target recognizer 13. The binary numbers which are presented to area target recognizer 13 identify the horizontal starting point of the line, the vertical line number, and the width of the suspected target.

After the possible target areas are located and stored in area target memory 93, they are converted to digital form and then stored in memory 95. The stored target arrays are then compared, by a correlation technique, with stylized target arrays to determine whether or not the potential target is a swimmer.

It can thus be seen that the present invention first determines whether a potential target should be investigated further by first assigning a probability factor based on target contrast and target width. Those targets passing the first test are then compared with a reference scene in order to make a final determination as to whether the target is a swimmer.

Obviously many modifications and variations of the present invention are possible in the light of the above teachings. It is therefore to be understood that within the scope of the appended claims the invention may be practiced otherwise than as specifically described.

I claim:

1. A device for recognizing a swimmer in water comprising,
    an electro-optical sensor providing a video display for viewing a target in water,
    first means for measuring the contrast of said target and assigning a first probability factor that said target is not a swimmer and measuring the width of said target and assigning a second probability factor that said target is not a swimmer,
    second means for encoding an area containing a target when said first means determines that said target has a probability of being a swimmer, said encoded target area being a portion of said video display,
    memory means for retaining said encoded target area,
    means providing reference scenes characteristic of a swimmer, and
    classification means for comparing said encoded target area with said reference scenes for determining whether said target is a swimmer.

2. A device for recognizing a swimmer as set forth in claim 1 having means for multiplying said first and second probability factors to provide a joint probability factor that a target is not a swimmer.

3. A device recognizing a swimmer as set forth in claim 1 wherein said encoded target area is converted to digital form and stored in said memory means and wherein said reference scenes are provided in digital form.

4. A device for recognizing a swimmer as set forth in claim 1 wherein said classification means is a digital comparator.

5. A device for recognizing a swimmer as set forth in claim 4 wherein an identification device is energized when said digital comparator correlates said encoded target area and said reference scenes.

* * * * *